Jan. 18, 1938.     M. S. BARNES     2,105,803
LAWN CLEANING AND FERTILIZING MACHINERY
Filed Jan. 30, 1937
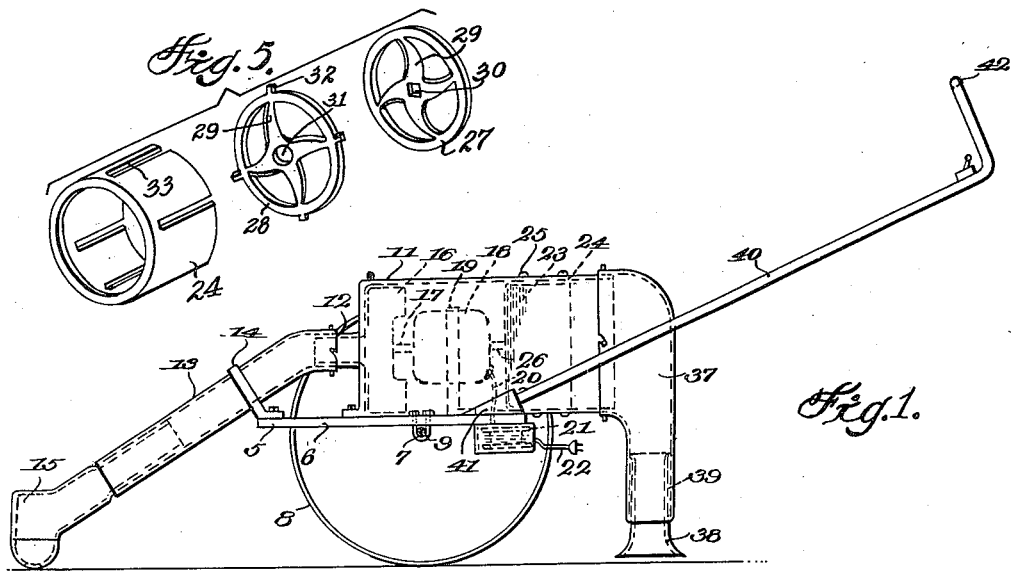
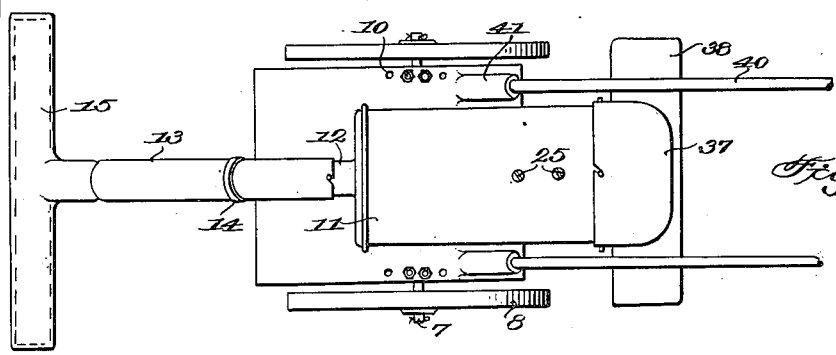
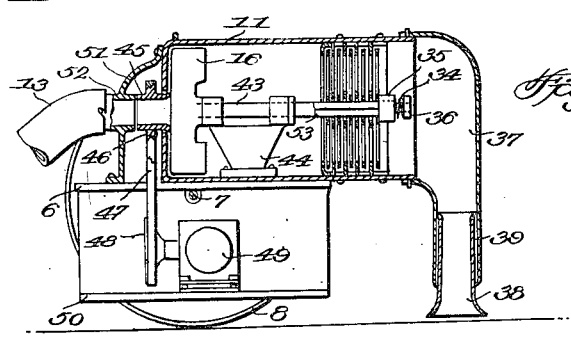
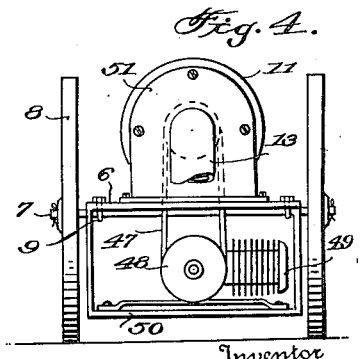

Patented Jan. 18, 1938

2,105,803

UNITED STATES PATENT OFFICE 2,105,803

LAWN CLEANING AND FERTILIZING MACHINERY

Merritt S. Barnes, Oneonta, N. Y.

Application January 30, 1937, Serial No. 123,229

6 Claims. (Cl. 55—118)

This invention relates to a lawn cleaning and fertilizing machine.

It is an object of the invention to provide a machine having suction means which is adapted to gather refuse such as leaves, grass clippings, etc., from the ground, convey the same through a cutting mechanism and distribute the shredded material over the ground.

Another object of the invention is to provide a machine of the above-mentioned character which is simple and durable in construction, reliable and efficient in operation and inexpensive to manufacture.

Other objects and advantages of the invention will be apparent during the course of the following specification.

In the accompanying drawing, forming a part of this specification and in which like numerals are employed to designate like parts throughout the same, Fig. 1 is a side elevation of the machine, Fig. 2 is a top plan view of the same, Fig. 3 is a fragmentary longitudinal sectional view of a slightly modified form of the machine, Fig. 4 is an end view of the machine shown in Fig. 3, and, Fig. 5 is a perspective view of the cutter unit with parts in separate relation.

In the drawing, wherein for the purpose of illustration, I have shown a preferred embodiment of the invention the numeral 5, denotes generally a wheeled frame which consists of a platform 6 supported on the axle 7 having wheels 8 journaled on the ends thereof. The platform is attached to the axle by U-bolts 9 which pass through openings 10 in the platform, there being a series of openings to permit adjustment of the axle to properly balance the platform thereon. A housing 11 is mounted on top of the platform having a relatively small inlet opening in its forward end surrounded by an outwardly projecting collar 12, to which is attached the downwardly inclined suction tube 13 which is secured to the forward edge of the platform 6 by a clamping band 14. The suction tube 13 is constructed of telescoping sections to permit longitudinal adjustment of the tube and a suction nozzle 15 is formed integral with the lower end of the lower section of the tube and is adapted to pass over the ground in close relationship thereto.

A suction fan 16 is disposed within the housing 11 adjacent the inlet opening and as shown in Fig. 1, is mounted on one end of the shaft 17 of an electric motor 18, supported by a bracket 19 and the electric cable 20 extending from the motor connects with a reel 21 attached to the bottom of the platform 6 and wound upon the reel is an extension cord 22 for connection with a suitable source of electric current, not shown, or if desired batteries may be carried beneath the platform.

The rear end of the housing 11 is open and removably mounted therein is a cutting unit 23 consisting of a tubular casing 24 secured in the rear end of the housing by screws 25. The free end 26 of the motor shaft 17 is square in cross section and extends the length of the casing 24. A plurality of rotating and stationary cutting disks 27 and 28 are mounted on the free end 26 of the motor shaft, each disk being stamped out to provide a series of spaced blades 29. The rotating disks are provided with square central apertures 30 whereby they are fixedly mounted on the shaft, while the stationary disks are provided with round central apertures 31 loosely mounting the disks on the shaft. The periphery of the stationary disks 28 are provided at spaced intervals with radially projecting pins 32 which engage in longitudinal slots 33 formed in the casing 24, whereby the stationary disks are held against rotative movement, but are free to be removed from the casing. The central square apertures of each rotating disk will be set at a different angle so that the cutting blades 29 will not be in alinement at the same time. The stationary and rotating disks are mounted on the shaft in alternate relation and are held in close contacting relation by the tension spring 34 mounted on the end of the shaft between the collar 35 and adjusting nut 36. A distributor spout 37 is detachably connected to the rear end of the housing 11 and extends downwardly in a vertical plane towards the ground having an elongated horizontal nozzle 38 telescopically connected to the lower end of the spout, as at 39, for distributing the shredded refuse over the ground. A U-shaped hollow pipe handle 40 has its ends attached to the platform 6, as at 41, and is inclined upwardly having a horizontal hand bar 42 at its upper end.

In Figs. 3 and 4, the suction fan 16 is mounted on a shaft 43 supported by brackets 44 and is provided with a tubular hub 45 which extends through the inlet opening of the housing 11 and formed integral with the hub is a pulley 46 which is connected by an endless belt 47 with the pulley 48 mounted on the shaft of the gas engine 49 supported on a base 50 beneath the platform 6. A casing 51 is disposed over the hub and pulley 46 having an outlet 52 in alinement with the hub to which is detachably connected the suction tube 13. The free end 53 of the shaft 43 is square in cross section and the cutting unit 23 is mounted thereon.

In operation, the machine is moved over the ground with the suction nozzle 15 in close proximity to the ground and the refuse on the ground is drawn into the suction tube 13 by the suction created by the fan 16 and after passing into the housing 11 is blown through the cutting unit 23 being shredded by the action of the rotating and stationary cutting disks. The shredded refuse passes into the distributor spout and is evenly distributed over the ground by the nozzle 38.

It is to be understood that the forms of my invention herein shown and described are to be taken as preferred examples of the same and that certain changes in the shape, size and arrangement of the parts may be made without departing from the spirit of the invention or the scope of the subjoined claims.

Having thus described my invention, I claim:—

1. A machine of the character described comprising a wheeled frame, a housing mounted on said frame having an inlet opening in its forward end and its rear end open, a suction fan mounted in said housing adjacent the inlet opening, means for driving said fan, an adjustable telescopic suction tube adapted to be detachably connected to the inlet opening of said housing, a cutting unit mounted in the rear end of said housing and a distributor spout connected to the rear end of said housing.

2. A machine of the character described comprising a wheeled frame, a housing mounted on said frame having an inlet opening in its forward end and its rear end open, a suction fan mounted in said housing adjacent the inlet opening of said housing having a tubular hub extending through the inlet opening, a pulley formed integral with said hub, a motor for driving said pulley, a casing enclosing said hub and pulley having an inlet opening in alinement with said hub, a suction tube detachably connected to the inlet opening of said casing and inclined downwardly therefrom, a nozzle at the lower end of said tube, a cutting unit mounted in the rear end of said housing and a distributor spout connected to the rear end of said housing.

3. A machine of the character described comprising a wheeled frame, a housing mounted on said frame having an inlet opening at its forward end and its rear end open, a suction fan mounted in the forward end of said housing, means for driving said fan, a suction tube connected to the inlet opening of said housing, a distributor spout mounted on the rear end of said housing and a cutting unit mounted in the rear end of said housing including co-acting stationary and rotating cutting disks.

4. A machine of the character described comprising a wheeled frame, a housing mounted on said frame having an inlet opening at its forward end and its rear end open, a shaft extending longitudinally of said housing, means for driving said shaft, a suction fan mounted on said shaft at the forward end of said housing, a suction nozzle connected to the inlet opening of said housing, a cutting unit including a tubular casing mounted in the rear end of said housing, rotating cutting disks fixedly mounted on said shaft within the casing, stationary cutting disks fixedly connected to the casing and adapted to co-act with said rotating disks and a distributor spout connected to the rear end of said housing.

5. A machine of the character described comprising a wheeled frame, a housing mounted on said frame having an inlet opening at one end and its opposite end open, a suction tube connected to the inlet opening of said housing and extending downwardly therefrom, a suction fan mounted in said housing adjacent the inlet opening, a cutting unit mounted in said housing between said fan and the open end of the casing and means for driving said fan to draw refuse into said housing and force it through said cutting unit.

6. A machine of the character described comprising a wheeled frame, a housing mounted on said frame having an inlet opening at one end and its opposite end open, a suction tube connected to the inlet opening of said housing and extending downwardly therefrom, a relatively wide nozzle connected to the lower end of said tube, a rotatable shaft mounted longitudinally of said housing, a suction fan mounted on said shaft adjacent the inlet opening of said housing, a cutting unit mounted in said housing adjacent the open end thereof including fixedly mounted cutting disks, rotating cutting disks mounted on said shaft to revolve therewith and co-act with said fixed cutting disks and means for rotating said shaft.

MERRITT S. BARNES.